Patented Mar. 5, 1935

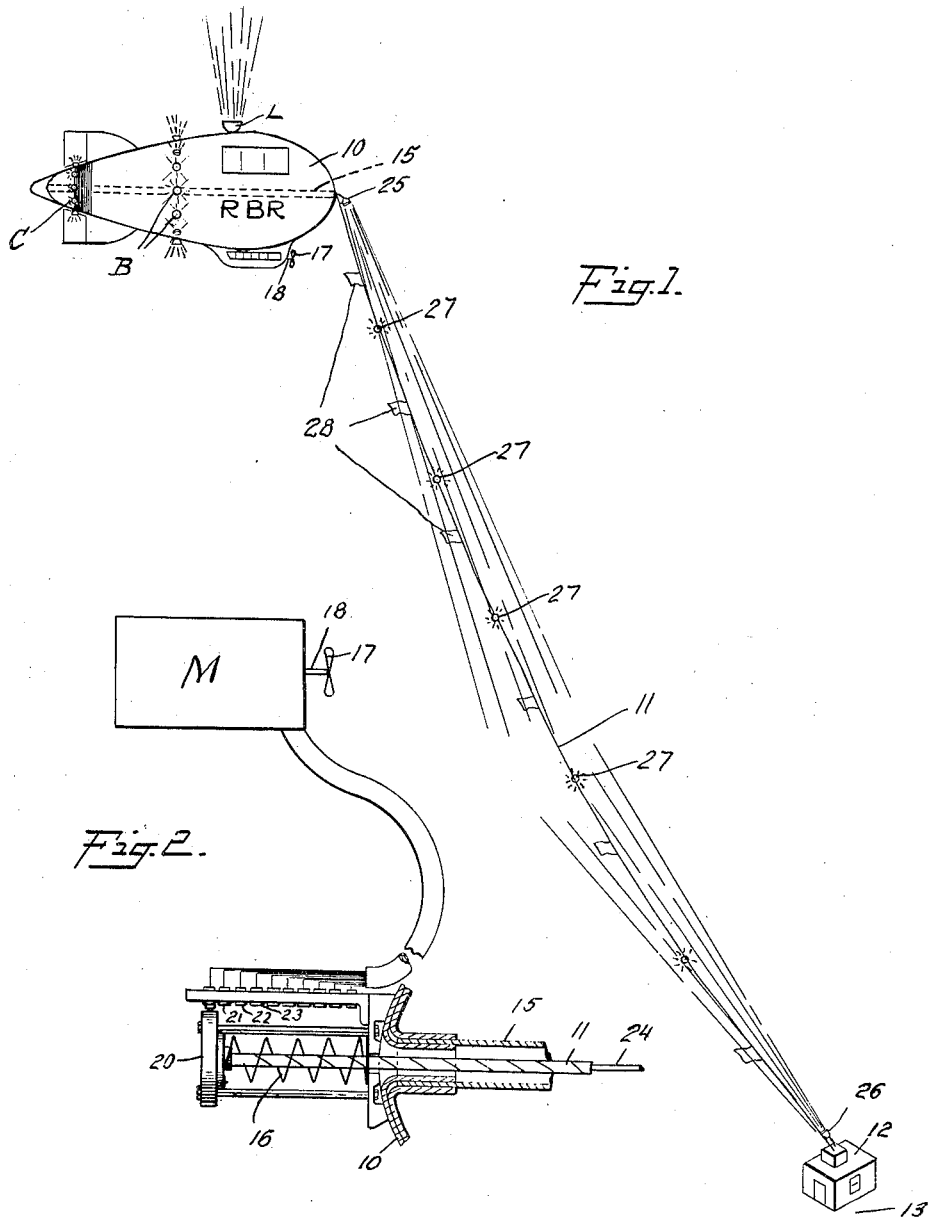

1,993,414

UNITED STATES PATENT OFFICE 1,993,414

AERIAL SIGNAL DEVICE

Roland B. Respess, Wickford, R. I., assignor to Respess Aeronautical Engineering Corporation, Cranston, R. I., a corporation of Rhode Island Application March 7, 1932, Serial No. 597,256

7 Claims. (Cl. 40—127)

This invention relates to aerial signal devices.

One of the greatest dangers to aerial navigation is the presence of fog or clouds that prevent pilots from properly charting their courses and from making safe landings.

The salient object of this invention is to provide illuminated or highly visible aerial signal means so constructed and arranged that aircraft pilots may easily determine or chart their courses of flight and may easily locate and establish the position of landing fields.

Another object of the invention is to provide means for furnishing information to pilots during flight as to visibility conditions on a landing field when the field is obscured by clouds, fog or other causes.

Another object of the invention is to provide a definitely located signal with data as to its location relative to an anchorage point in the landing area, such for instance, as information as to the elevation of the signal and the compass direction and angle of slant from the signal to the anchorage.

Further objects of the invention will appear from the following specification taken in connection with the drawing which forms a part of this application, and in which Fig. 1 is an elevational view somewhat schematic and diagrammatic illustrating a signal device embodying the invention; and Fig. 2 is a sectional elevation, somewhat diagrammatic, showing the cable connection to the ship and variable motor control.

The invention briefly described consists of aerial signal mechanism comprising an airship, a ground anchorage and a cable connecting the anchorage with the ship. The cable may be illuminated or in some way rendered clearly visible and is preferably connected to the ship resiliently and means may be provided for relieving undue tension on the cable when the tension has exceeded a predetermined limit. This may be done by providing propelling mechanism which is set in operation when the tension on the cable is excessive.

The ship should be illuminated and should carry a beacon or search light and may have displayed thereon in any suitable manner data giving information as to the distance from the landing field, the angle of inclination of the ship and any further information desired.

Further details of the invention will appear from the following description.

It is a comparatively simple matter for an aircraft pilot by the use of instruments now available to chart his course or to make a safe landing when it is possible for him to sight land marks or his landing field. It is, therefore, logical that a pilot would be able to chart his course or make a safe landing in a fog or other conditions when the visibility is poor provided he is supplied with accurate information as to the landing field or as to his location.

This invention contemplates supplying such information to pilots by the use of aerial signal means, such as captive balloons or dirigibles which may be called signal ships, located at such altitudes as to be ordinarily disposed above ground fogs or clouds.

Each signal ship should be properly marked or designated and reference books should be supplied to furnish information as to the location of each ship and also as to the size of the ship and compass points, the location of the ship relative to a landing field, the length of cable between the anchorage and the ship and such further information as may seem desirable.

The ship should also be provided with high power aerial beacons and/or lights to enable pilots to "pick-up" the ship from considerable distances.

Furthermore, a system of radio or wire communication between airports should be established so that before a pilot leaves an airport he may be advised as to weather conditions along his proposed route and such information may also be displayed on signal ships by means of code terms.

Although captive balloons may serve as signal ships for airports or landing fields it is preferable to use a controlled dirigible elongated or cigar shaped in outline and light in weight in order to effect the required lift with a minimum volume displacement.

The dirigible or signal ship should be rugged in order to withstand violent wind pressures and buffetings and should be capable of attachment to an anchor cable in such a manner that the weight of the cable and the pull may be absorbed effectively without injury to the ship.

It is desirable that the dirigible be designed to carry one or more motors and be provided with propellers that may be used to automatically relieve excess strain on the anchorage cable. Furthermore, it may be found desirable to carry a crew in which case internal combustion engines should be provided and also provisions should be made for the storage of fuel, water, oil and quarters for the crew. Such a ship would also carry suitable control mechanism.

In the drawing there is shown a ship 10 of the dirigible type which is connected by a cable 11 to an anchorage 12 located on a ground area or landing field 13.

The ship 10 is elongated or cigar shaped and, as shown particularly in Fig. 2, has extending longitudinally therein a centrally disposed tube 15. The cable 11 extends into the nose of the ship and through the tube to the rear end thereof where it is attached to an elastic tension device, such as the spring 16.

The ship is provided with a propeller 17 carried by a shaft 18 which is driven by a motor M, preferably an electric motor.

In order to prevent injury to the ship and to prevent breaking of the cable under excessive strains means is provided for starting the motor and driving the motor and propeller at variable speeds in a direction to propel the ship and relieve the strain when the tension on the cable passes a predetermined limit. For purposes of illustration such means may consist of a movable circuit closing member 20 controlled by the cable and arranged to engage contacts 21, 22, 23, etc. in the motor circuit when the strain on the cable passes a predetermined limit. Power for driving the motor may be supplied through a power line 24 enclosed within the cable 11. The illustration of the motor circuit closing means in Fig. 2 is merely diagrammatic and any desired type of switch and contacts may be utilized. It will be understood that whenever the switch closing member 20 engages one of the contacts 21, 22, 23, etc., the circuit through the motor will be closed and the motor will be driven at speeds depending on the particular contact engaged by the switch closing member. For instance, if the tension on the cable 11 is sufficient to cause the member 20 to engage the contact 23 the motor will be driven at a speed sufficient to overcome this tension and to maintain the ship at a definite or predetermined level. On the other hand, if the tension is only sufficient to engage the contact 21 the motor will not be driven at as great a speed, but will maintain the signal ship at a predetermined or definite level. This is important since it enables the observer to determine the exact location of the landing field.

The cable 11 connecting the ship to the ground anchorage should be of the general type designated as hoisting cable, but should be specially constructed to include or house conduits for conducting a lighting circuit and power circuit to the ship. Other wires or conduits may also be housed in the cable for providing telephonic communication with the ship or operating signal devices. Means, such as lamps 25, 26 on the ship and on the anchorage may also be provided for illuminating the cable or rendering it visible and electric lights 27 may be located on the cable or the cable may be located by flags 28, markers or the use of luminescent paint.

The signal ship preferably carries a beacon or searchlight L and should be so marked as to establish its identity and may be illuminated at night as by a series of lamps B. The signals should be posted so as to be clearly visible from all directions and should preferably be posted in at least three places, namely, the top and sides and should be sufficiently prominent to be easily read at a distance. The ship should also have a circle C on its stern which should be illuminated at night.

To determine the true declination from the bow of the signal ship to its anchorage and the true compass direction from the bow to the anchorage, it is preferred that the inclination and direction of the cable as regards the anchorage point be taken and then at the same time similar reading be available as to the true direction and declination as regards to the bow of the signal ship. With the length of the cable being known, the sag of the cable having been previously established, under different conditions, if the ship remains in straight line direction with the cable the necessary angle for landing may easily be obtained. It is probable, however, that the wind pressures may at times move the ship out of line, to either side, thus by comparing the readings at the anchorage and at the bow of the ship, the exact angle of direction and slant of the cable can be obtained and this information be posted on the signal ship, or may, if desired, be transmitted by wireless telegraph or radio.

An approaching pilot should pass over the ship and to one side to read the posted direction and declination, in two places to avoid error in the signals through mechanical faults, then should pass to the stern of the ship where by sighting the size and shape of the ring at the stern through a reducing glass that is marked with circles, he can accurately estimate his distance from the bow of the ship and thus may accurately chart his descent to one side of the ground anchorage.

It is expected considerable valuable data may be secured and compiled through observation and experiment in clear weather and such data be also made available to aircraft pilots. For illustration the effect of wind velocities at various altitudes affecting the swing of the cable so that a safe distance may be kept away from the cable when landing. Also to enable pilots to know the altitude of the signal ship and avoid the cable in passing over a field, especially at night, when a view of the airport may be obtained but the signal ship may be obscured by a cloud.

It should be understood I have directed these specifications in some detail to a preferred method and equipment without purpose of restricting the scope of my invention which simply stated is to establish over or connected with a landing point a signal device so arranged to remain within prescribed bounds and through which signal pilots of aircraft may be able to chart their descent to a safe landing. It is expected and intended any mechanism or equipment which may be helpful in assisting in the operation of my invention may be employed.

It is to be understood my invention contemplates supplying aerial signals that are connected with landing places which may at times be obscured by fog and are employed to supply means to direct a true passage or landing, thus may not be confused with captive balloons or airships that may have heretofore been employed as observation stations.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. Aerial signal mechanism comprising an airship, a ground anchorage, a cable connecting the anchorage and ship, ship propelling means for automatically relieving tension on the cable and means for setting said propelling means in operation when said tension exceeds a predetermined limit.

2. Aerial signal mechanism comprising an airship, a ground anchorage, a cable connecting the anchorage and ship, the ship having a central longitudinal tube therein and the cable extending into said tube and being resiliently secured at the rear end portion thereof.

3. Aerial signal mechanism comprising an airship, a ground anchorage, a cable connecting the anchorage and ship, a power line connecting said ship to the ground, a motor carried by the ship, a propeller operatively driven by the motor, connections between the power line and motor including a switch, and means for automatically closing said switch when the pull on the cable exceeds a predetermined limit.

4. Aerial signal mechanism comprising an airship, a ground anchorage, a cable connecting the anchorage and ship, a power line connecting said ship to the ground, means for propelling the ship, and means controlled by the tension on the cable for starting said propelling means.

5. Aerial signal mechanism comprising an airship, a ground anchorage, a cable connecting the anchorage and ship, a power line connecting said ship to the ground, means for propelling the ship, and means for automatically starting said propelling means when the tension on the cable exceeds a predetermined limit.

6. Aerial signal mechanism comprising an airship, a ground anchorage, a cable connecting the anchorage and ship, a power line connecting said ship to the ground, means for propelling the ship, and variable speed means including connections between the power line and propelling means and controlled by the tension on the cable for operating said propelling means.

7. Aerial signal mechanism comprising an anchored airship, a ground anchorage, a cable connecting the anchorage to the ship, indicia encircling the stern of the ship, and power operated propelling means for maintaining the ship at a definite elevation.

ROLAND B. RESPESS.